US005615704A

United States Patent [19]

Sell

[11] Patent Number: 5,615,704

[45] Date of Patent: Apr. 1, 1997

[54] PUSH BUTTON PENDANT FOR A HOIST OR WINCH

[75] Inventor: Leslie J. Sell, Bothell, Wash.

[73] Assignee: Ingersoll-Rand Company, Woodcliff Lake, N.J.

[21] Appl. No.: 556,789

[22] Filed: Nov. 2, 1995

[51] Int. Cl.[6] .......... F15B 13/02; F16K 11/22

[52] U.S. Cl. .......... 137/596.1; 137/884

[58] Field of Search .......... 137/596.1, 884; 212/285

[56] References Cited

U.S. PATENT DOCUMENTS 4,307,810 12/1981 Spalluto .......... 212/285

4,508,014 4/1985 Shoff .......... 137/596.12 X 4,830,049 5/1989 Smith .......... 212/285 X

*Primary Examiner*—Gerald A. Michalsky

*Attorney, Agent, or Firm*—Walter C. Vliet

[57] ABSTRACT

A modular compact push button pendant for a hoist or winch is assembled of modular component parts along common passageways selectively ported by gaskets, seal plates, and spool valve stems directly operated by push buttons assembled in a straight line path to permit ready change and selection of function options and orientation.

10 Claims, 2 Drawing Sheets

PUSH BUTTON PENDANT FOR A HOIST OR WINCH

BACKGROUND OF THE INVENTION

This invention relates generally to push button pendant stations and more particularly to a pneumatic push button pendant for remote control station for a hoist or winch.

Current push button stations are usually called pendants since they are designed for use on overhead hoists from which they are flexibly suspended within reach of the operator. Because it is suspended, the size and weight of the pendant was never considered to be a problem.

It is often desirable on a winch to have the ability to operate from a remote location, generally between six and thirty feet from the winch. To meet this requirement, a hoist pendant is often adapted for use on a winch by flexibly connecting the pendant to the winch control valve. A problem with this arrangement is that winches are usually mounted at operator level, so the pendant cannot be suspended and being typically bulky and heavy, it is uncomfortable to operate and sometimes requires two handed operation. A second problem is that no provision is made to 'park' the pendant when not in use or when it is desired to operate the winch from a fixed location. A third problem is that air supply and pilot signal tubing connects to the top of the pendant which is convenient for a hoist but for a winch this tubing should exit from the bottom of the pendant towards ground level. A fourth problem is that a pendant on a winch is often temporarily placed on surfaces that are contaminated with dirt and oil and if the pendant is not easily cleaned it will also become contaminated.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention this is accomplished by providing a push button pendant for a winch or hoist comprising a generally rectangular elongated box formed by stacking a plurality of generally rectangular push button modules on a generally rectangular base which is in turn connected to a pneumatic actuator for a winch or the like by hose means; and each of the push button modules being further provided with a push button connected to a balanced spool stem sequentially addressing an air pressure inlet supply port, an appropriate signal port, and an exhaust port as a means for effecting winch control.

The foregoing and other aspects of the invention will become apparent from the following detailed description of the invention when considered in conjunction with the accompanying drawing figures.

BRIEF DESCRIPTION OF THE DRAWING FIGURES

DETAILED DESCRIPTION

Figure 2:
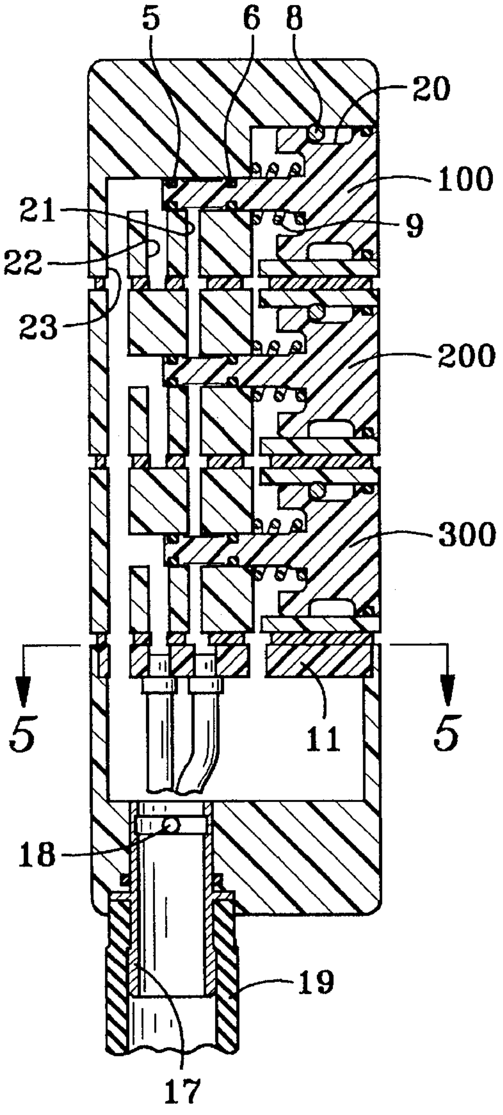
FIG. 2 is a cross section showing the unique construction of the push button pendant head according to the present invention.
Figure 3:
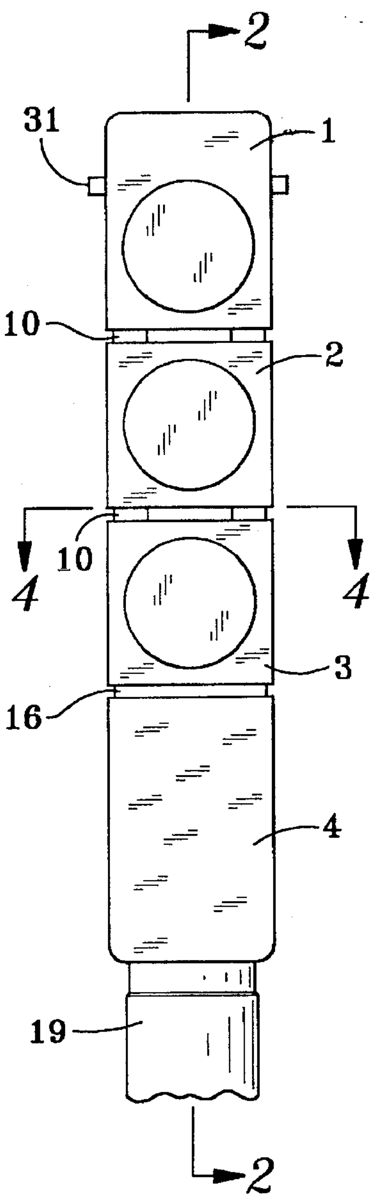
FIG. 3 is a front elevation view of the pendant according to the present invention.

FIG. 2 shows a cross section and FIG. 3 shows a front view of a push button station configured for a winch application according to the present invention.

Three push button modules 1, 2, and 3 are shown stacked on top of connection block 4. Modules 2 and 3 are identical intermediate modules. Module 1 caps the station.

Button 100 causes the winch to haul in, button 200 causes the winch to pay out and button 300 is an emergency stop button that causes the main air supply to the winch to be shut off.

All buttons are identical and have an integral stem grooved for O-ring seals 5 and 6 and a button head grooved for O-ring 7. To minimize friction the O-ring seals are of the known 'floating design' in which they are circumferentially squeezed rather than being squeezed on their cross section. Each button is retained flush with the module surface by cross pin 8 that passes through the module housing and engages elongated groove 20 in the button. A return spring 9 urges the button out so that the left edge of elongated groove 20 contacts cross pin 8. The flush push buttons prevent accidental operation and they also prevent dirt build-up which causes other types of pendant operations (e.g., levers) to stick.

A module consisting of the housing and push button has three circular drilled ports that communicate with the stem bore in which O-rings 5 and 6 ride. Port 21 is air inlet, port 22 is pilot signal and port 23 is exhaust air out.

Left movement of the button, as viewed in FIG. 2, creates a variable inlet and exhaust orifice at the same time in the following manner. When a button is fully to the right, inlet air at port 21 is trapped by O-rings 5 and 6 and port 22 is connected to port 23 at zero or exhaust pressure. As the button progressively moves to the left, O-ring 5 starts to cross port 22 and admit inlet air while at the same time it starts closing the communication between port 22 and port 23. In this manner, movement of a button to the left adjusts the ratio of inlet air to escaping air to create a variable pressure differential at port 22. When a button is completely to the left, O-ring 5 has completely crossed port 22 and closed off communication between port 22 and port 23, at which point the pressure at port 22 is the same as that at inlet port 21. When a button is actuated the internal air pressure forces are essentially balanced, this together with a 'floating' O-ring design, ensures that the button actuating force is very light, smooth and comfortable.

Figure 4:
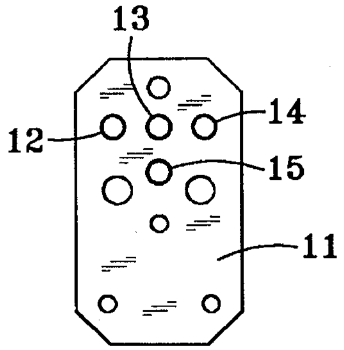
FIG. 4 is a cross section of the pendant taken at Section 4—4 of FIG. 3.
Figure 5:
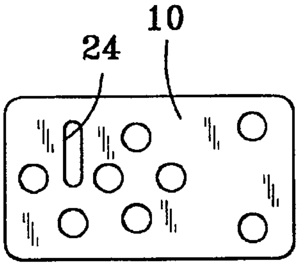
FIG. 5 is a cross section of the pendant taken at Section 5—5 of FIG. 2 showing the flow control ports.

FIGS. 4 and 5 show top view of connection plate 11 and gasket 10 respectively. On the three button station shown in FIG. 2, gasket 10 is used between module 1 and 2 and also between module 2 and 3. Gasket 10 serves to direct the pilot air signal from port 22 to the appropriate connection point on connection plate 11 through slot 24 on the gasket. Between modules 1 and 2 slot 24 is to the right (as shown by FIG. 5) to transfer the output of port 22 of module 1 via through holes in modules 2 and 3 to the right hand connection 14 on plate 11. Between modules 2 and 3 slot 24 is to the left to transfer the output of port 22 of module 2 to the left hand connection 12 on plate 11. The output of port 22 of module 3 is transferred directly by a hole in gasket 16 to connection 13 on plate 11. Port 21 in intermediate modules 2 and 3 is a through hole to transfer inlet air connection 15 from module to module.

Flexible tubes on connections 12, 13, 14, and 15 pass through swivel 17 and terminate at a manifold block on the winch control valve after passing through a similar swivel fitting. Flexible tubes 12, 13, and 14 transmit pilot signals via the manifold block on the winch control valve. Flexible tube 15 transmits the air supply from the manifold block to port 21 on module 3 of the push button station.

Swivel 17 is slotted to receive pin 18 which retains it in connection block 4 while allowing it to rotate 180 degrees.

Low pressure hose 19 pushes over swivel 17 and a similar swivel on the manifold block on the winch control valve to form a protective sheath.

Figure 1:
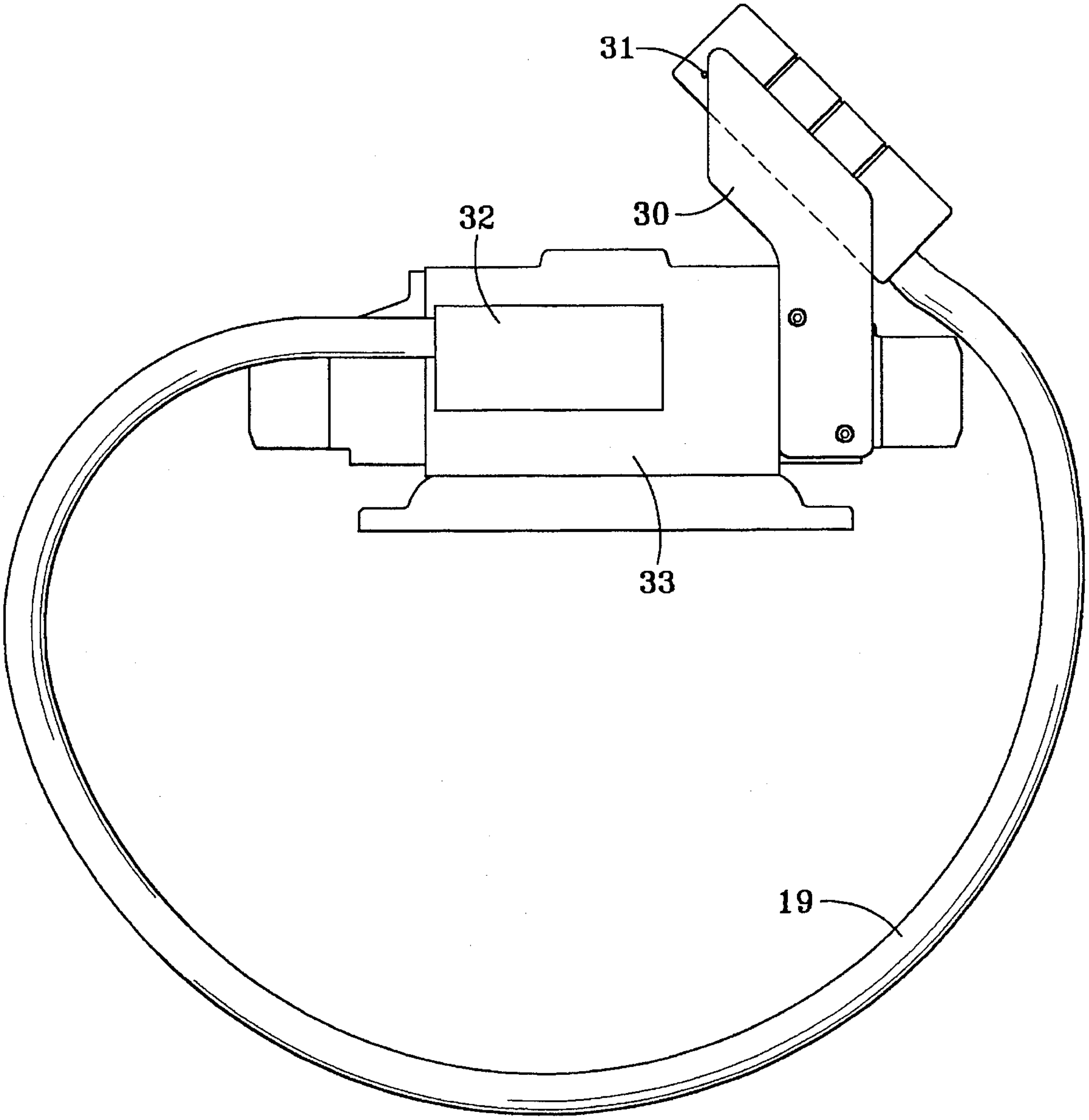
FIG. 1 shows a typical pendant application according to the present invention used in conjunction with a winch air operating valve.

Referring to FIG. 1, the push button station stores on cradle 30 which is mounted on the winch control valve. The shape of cradle 30 is such that it enables convenient operation from the cradle as a fixed station. The cradle is slotted to match the width of the push button station at an angle of 45 degrees and pins 31 protruding slightly from either side of module 1 engage the top edges of this slot to retain the station.

Referring to FIG. 2, adaptation for use as a hoist pendant would simply require that the push button station be turned upside down and the buttons labeled accordingly. Additional push button modules could be added by using slotted gaskets that direct pilot signals to different through holes and additional connections on plate 11.

Having described my invention in terms of a preferred embodiment, I do not wish to be limited in the scope of my invention except as claimed.

What is claimed is:

1. A push button pendant for a winch comprising:

a generally rectangular elongated box formed by stacking a plurality of generally rectangular push button modules on a generally rectangular base which is in turn connected to a pneumatic actuator for a winch by hose means; and each of said push button modules being further provided with a push button connected to a balanced spool stem sequentially addressing an air pressure inlet supply port, an appropriate signal port, and an exhaust port as a means for effecting winch control.

2. A push button pendant for a winch according to claim 1 wherein:

each of said plurality of push button modules is further provided with a flush sealed push button.

3. A push button pendant for a winch according to claim 2 wherein:

each of said push buttons is spring loaded to a neutral position.

4. A push button pendant for a winch according to claim 1 wherein:

each of said modules and said base are manufactured of a high impact, stable plastic material.

5. A push button pendant for a winch according to claim 1 wherein:

each of said modules and said base are assembled with a selectively ported gasket between them.

6. A push button pendant for a winch according to claim 1 wherein:

said base is further provided with a porting connection plate in selective registration with a porting gasket.

7. A push button pendant for a winch according to claim 1 wherein:

said base is further connected to a winch control means by a hose including an air supply tube and signal supply tube.

8. A push button pendant for a winch according to claim 7 wherein:

said hose is provided with a swivel to permit rotation relative to said pendant.

9. A push button pendant for a winch according to claim 1 wherein:

said pendant may be inverted for alternative use as a winch or hoist pendant.

10. A push button pendant for a winch according to claim 1 wherein:

said pendant is further provided with mounting means for parking or using said pendant with a winch.

* * * * *